United States Patent
Gal et al.

(10) Patent No.: US 10,205,634 B2
(45) Date of Patent: Feb. 12, 2019

(54) ADAPTIVE MULTI-PHASE NETWORK POLICY OPTIMIZATION

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US); Tejaswini Ganapathi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 33 days.

(21) Appl. No.: 15/593,635

(22) Filed: May 12, 2017

(65) Prior Publication Data
US 2018/0331908 A1  Nov. 15, 2018

(51) Int. Cl.
*H04L 12/26* (2006.01)
*H04L 12/24* (2006.01)
*H04L 29/06* (2006.01)
*H04L 29/08* (2006.01)

(52) U.S. Cl.
CPC ........ *H04L 41/0893* (2013.01); *H04L 41/046* (2013.01); *H04L 43/16* (2013.01); *H04L 67/28* (2013.01); *H04L 69/16* (2013.01)

(58) Field of Classification Search
None
See application file for complete search history.

(56) References Cited

U.S. PATENT DOCUMENTS

2014/0304395 A1* 10/2014 Chandrayana .... H04L 29/08072
                                                            709/224
2016/0344738 A1* 11/2016 Dotan ................... H04L 63/101

* cited by examiner

*Primary Examiner* — Natisha D Cox
(74) *Attorney, Agent, or Firm* — Wong & Rees LLP; Kirk D. Wong

(57) ABSTRACT

An adaptive multi-phase approach to estimating network parameters is presented. By gathering and aggregating raw network traffic data and comparing against default network parameters, a training data set may be generated. A black box optimization may be used in tandem with a supervised learning algorithm to bias towards better choices and eventually pick network parameters which optimize performance. Data delivery strategies are applied to deliver content using the optimized network policies based on the estimated parameters.

18 Claims, 5 Drawing Sheets

System 100

ADAPTIVE MULTI-PHASE NETWORK POLICY OPTIMIZATION

TECHNOLOGY

The present invention relates generally to optimizing network policies in content delivery, and in particular, to an adaptive multi-phase performance data driven approach.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Numerous parameters may be used in TCP to help in ordered data transfer, retransmission of lost packets, error-free data transfer, flow control, and congestion control. However, identifying an optimal data value for a single TCP parameter based on changing network characteristics remains a challenge.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
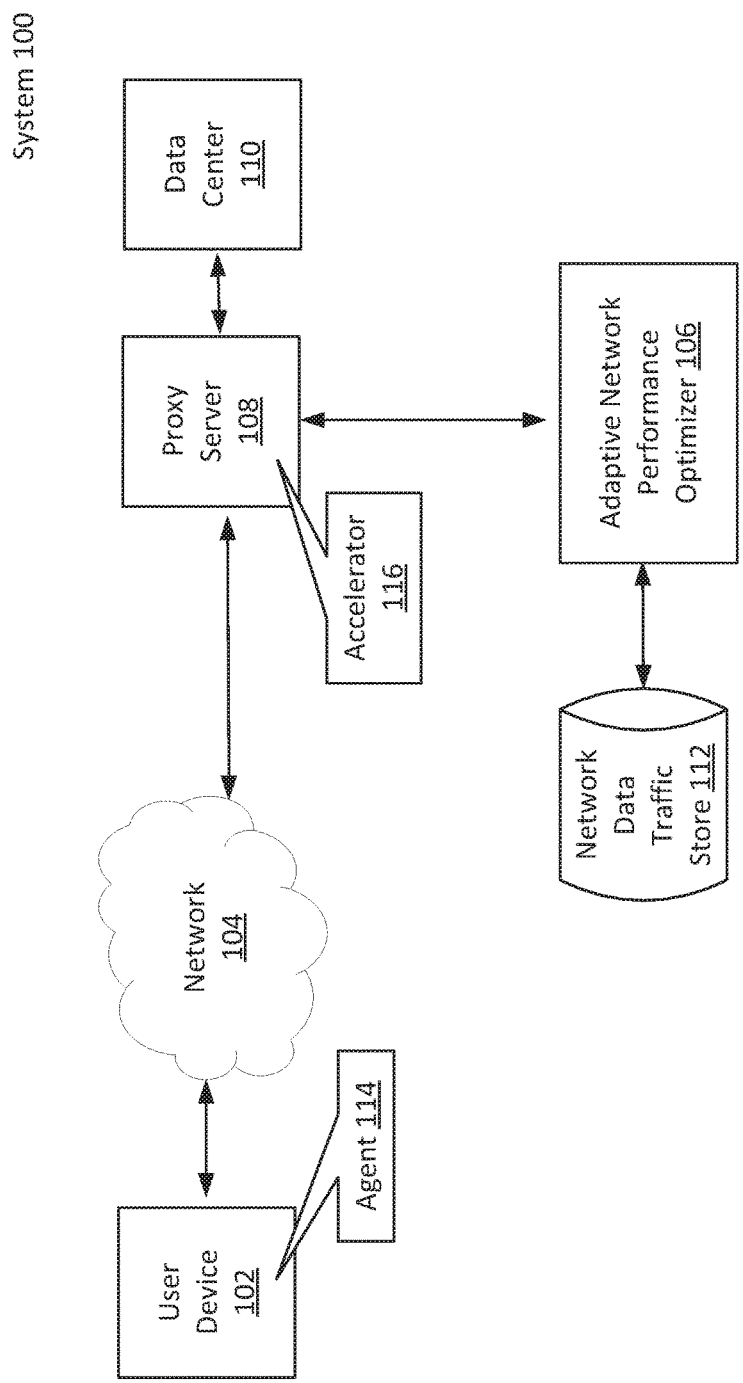
FIG. 1 illustrates a high-level block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. USING RAW NETWORK TRAFFIC DATA TO GENERATE ADAPTIVE LEARNING DATASETS
3. ESTIMATING TCP PARAMETERS USING ADAPTIVE LEARNING DATASETS
4. CONVERGENCE ON OPTIMUM TCP PARAMETERS
5. IMPLEMENTATION MECHANISMS—HARDWARE OVERVIEW
6. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. To maximize improvement in throughput gain and download complete time, TCP parameters may be estimated using a data driven approach by analyzing prior wireless network traffic data. Because wireless networks are volatile and non-stationary (i.e., statistics change with time), estimating TCP parameters poses several challenges. The estimate should be adaptive to capture volatilities in the wireless network, but also stable and not overly sensitive to short term fluctuations. Further, raw network traffic data does not capture the performance in improvement of throughput and download complete time of a particular set of TCP parameters. Methods and techniques described herein adaptively estimates TCP parameters by developing algorithms that operate on past data.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Using Raw Network Traffic Data to Generate Adaptive Learning Datasets

The performance of data delivery is closely tied to the operating conditions within which the end-device is operating. With ubiquitous wireless access over cellular and WiFi networks, there is a lot of volatility in operating conditions, so acceleration techniques must adapt to such a network by adapting to these conditions, e.g., the performance achievable over a private WiFi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but not limited to, any combination of:

Type of device, e.g., iPhone, iPad, Blackberry, etc.
  This may also include the version of the device and manufacturer information.
Device characteristics, e.g., the type of its modem, CPU/GPU, encryption hardware, battery, NFC (Near Field Communication) chipset, memory size and type or any other hardware information that impacts performance
Mobility of device, e.g., whether the device is on a moving vehicle/train etc., or is stationary/semi-stationary.
Operating System on the device.
Operating System characteristics, e.g., buffering, timers, public and hidden operating system facilities (APIs), etc.
  This may also include operating system limitations such as number of simultaneous connections allowed to a single domain, etc.
Usage information related to various device elements, e.g., Memory, Storage, CPU/GPU etc.
Battery charge and mode of powering the device.
Time of day.
Location where available.
IP Address and port numbers.
Network type, e.g., WiFi or Cellular, or 3G/4G/LTE, etc., or Public/Home WiFi, etc.
  SSID (Service Set Identifier) in WiFi networks.
  802.11 network type for WiFi networks.
Service Provider information, e.g., AT&T or Verizon for cellular, Time Warner or Comcast for WiFi, etc.
Strength of signal from the access point (e.g., Wi-Fi hot spot, cellular tower, etc.) for both upstream and downstream direction.
Cell-Tower or Hot-Spot identifier in any form.
Number of sectors in the cell tower or hot spot.
Spectrum allocated to each cell tower and/or sector.
Any software or hardware limitation placed on the hotspot/cell tower.
Any information on the network elements in the path of traffic from device to the content server.
Firewall Policy rules, if available.
Any active measurements on the device, e.g., techniques that measure one-way delay between web-server and device, bandwidth, jitter, etc.
Medium of request, e.g., native app, hybrid app, webbrowser, etc.
  Other information describing the medium, e.g., web browser type (e.g., Safari, Chrome, Firefox etc.), application name, etc.
Any other third party software that is installed on the device which impacts data delivery performance.
Content Type, e.g., image, video, text, email, etc.
  Also includes the nature of content if it is dynamic or static.
Content Location, e.g., coming from origin server or being served from a CDN (Content Delivery Network).
  In the case of a CDN, any optimization strategies being employed, if available.
Recent device performance statistics, e.g., dropped packets, bytes transferred, connections initiated, persistent/on-going connections, active memory, hard disk space available, etc.
Caching strategies if any, that are available or in use on the device or by the application requesting the content.
In the case of content, where multiple objects have to be fetched to completely display the content, the order in which requests are placed and the order in which objects are delivered to the device. The request method for each of these objects is also of interest.

Based on the operating context, a cognitive engine may be able to recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:
- Methods used to query the location of service point, e.g., DNS, etc.
  - This may involve strategies that include, but are not limited to, any combination of: choosing the best DNS servers based on response times, DNS prefetching, DNS refreshing/caching, etc.
- Protocols available for data transport, e.g., UDP, TCP, SCTP, RDP, ROHC, etc.
- Methods to request or send data as provided by the operating system, e.g., sockets, CFHTTP or NSURL-Connection in Apple's iOS, HttpUrlConnection in Google's Android, etc.
- Session oriented protocols available for requests, e.g., HTTP, HTTPS, FTP, RTP, Telnet, etc.
- Full duplex communication over data transport protocols, e.g., SPDY, Websockets, etc.
- Caching and or storage support provided in the Operating System.
- Compression, right sizing or other support in the devices to help reduce size of data communication.
- Transaction priorities which outline the order in which network transactions to be completed:
  - E.g., this may be a list of transactions where the priority scheme is simply a random ordering of objects to be downloaded.
- Content specific data delivery mechanisms, e.g., HTTP Live Streaming, DASH, Multicast, etc.
- Encryption support in the device:
  - Also includes secure transport mechanisms, e.g., SSL, TLS, etc.
- VPN (Virtual Private Network) of any kind where available and/or configured on the device.
- Any tunneling protocol support available or in use on the device.
- Ability to use or influence rules on the device which dictate how the data needs to be accessed or requested or delivered.
  - This includes, but is not limited to, any combination of: firewall rules, policies configured to reduce data usage, etc.
- Ability to pick the radio technology to use to get/send data. For example, if allowed, the ability to choose cellular network to get some data instead of using a public Wi-Fi network.
- Ability to run data requests or process data in the background.
- Threading, locking, and queuing support in the Operating System.
- Ability to modify radio power if available.
- Presence and/or availability of any error correction scheme in the device.
- In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304395, entitled "Cognitive Data Delivery Optimizing System," filed Nov. 12, 2013, and which is hereby incorporated by reference in its entirety for all purposes. Embodiments are not tied down by assumptions on the current nature of the system. An adaptive network performance optimizer 106 may use raw network traffic data to generate an adaptive learning dataset.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. The adaptive network performance optimizer 106 may gather information from the proxy server 108 and store information in the network data traffic store 112, in an embodiment. For example, with a priori knowledge of the possible parameter space of the TCP parameters, a range of values in the space may be set for each TCP parameter. Then, over time, mobile network traffic may be assigned parameters from this space at random and performance data may be stored in the network data traffic store 112. The mobile network traffic data may be stored as static policy data in the network data traffic store 112. A subset of the traffic may be performed with default TCP parameters of the carrier and data about that traffic may be stored as bypass traffic data.

Each database record in the network data traffic store 112 may include performance metrics comparing the static policy data against the bypass traffic data. For example, data representing outcomes of the download such as the throughput, download complete time, and time to first byte, may be captured in each database record in the network data traffic store 112 for each static policy. Performance metrics such as percentage improvement in throughput and download complete time of the policy applied compared to the bypass traffic may also be stored in the network data traffic store 112, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that provides inputs about the real-time operating conditions, participates and performs active network measurements, and executes recommended strategies. The agent 114 may be supplied in a software development kit (SDK) and is installed on the user device 102 when an application that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc.

An accelerator 116 sits in the path of the data traffic within a proxy server 108 and executes recommended strategies in addition to gathering and measuring network-related information in real-time. The accelerator 116 may propagate network policies from the adaptive network performance optimizer 106 to the proxy server 108, in one embodiment. In another embodiment, the agent 114 may implement one or more network policies from the adaptive network performance optimizer 106. For example, the optimal number of simultaneous network connections may be propagated as a network policy from the adaptive network performance optimizer 106 through the network 104 to the agent 114 embedded on the user device 102. As another example, the transmission rate of file transfer may be limited to 20 MB/sec by the accelerator 116 as a network policy propagated by the adaptive network performance optimizer 106 based on supervised learning and performance metrics. Here, the term "supervised learning" is defined as providing datasets to train a machine to get desired outputs as opposed to "unsupervised learning" where no datasets are provided and data is clustered into classes.

Once a multitude of raw network traffic data associated with data requests between user devices 102 and the data centers 110 are logged in the network data traffic store 112, it becomes possible to aggregate this data by static policy and time block. For example, this aggregation may record outcomes of the download, such as the throughput, download complete time, and time to first byte, as a moving average over 24 hours. A moving average increases the number of download requests used to calculate the average statistic, increasing its statistical significance and adds additional data to the adaptive learning system. Each row of aggregated data also records performance metrics such as percentage improvement in throughput and download complete time of the policy applied in comparison to the bypass traffic.

3. Estimating TCP Parameters Using Adaptive Learning Datasets

Figure 2:
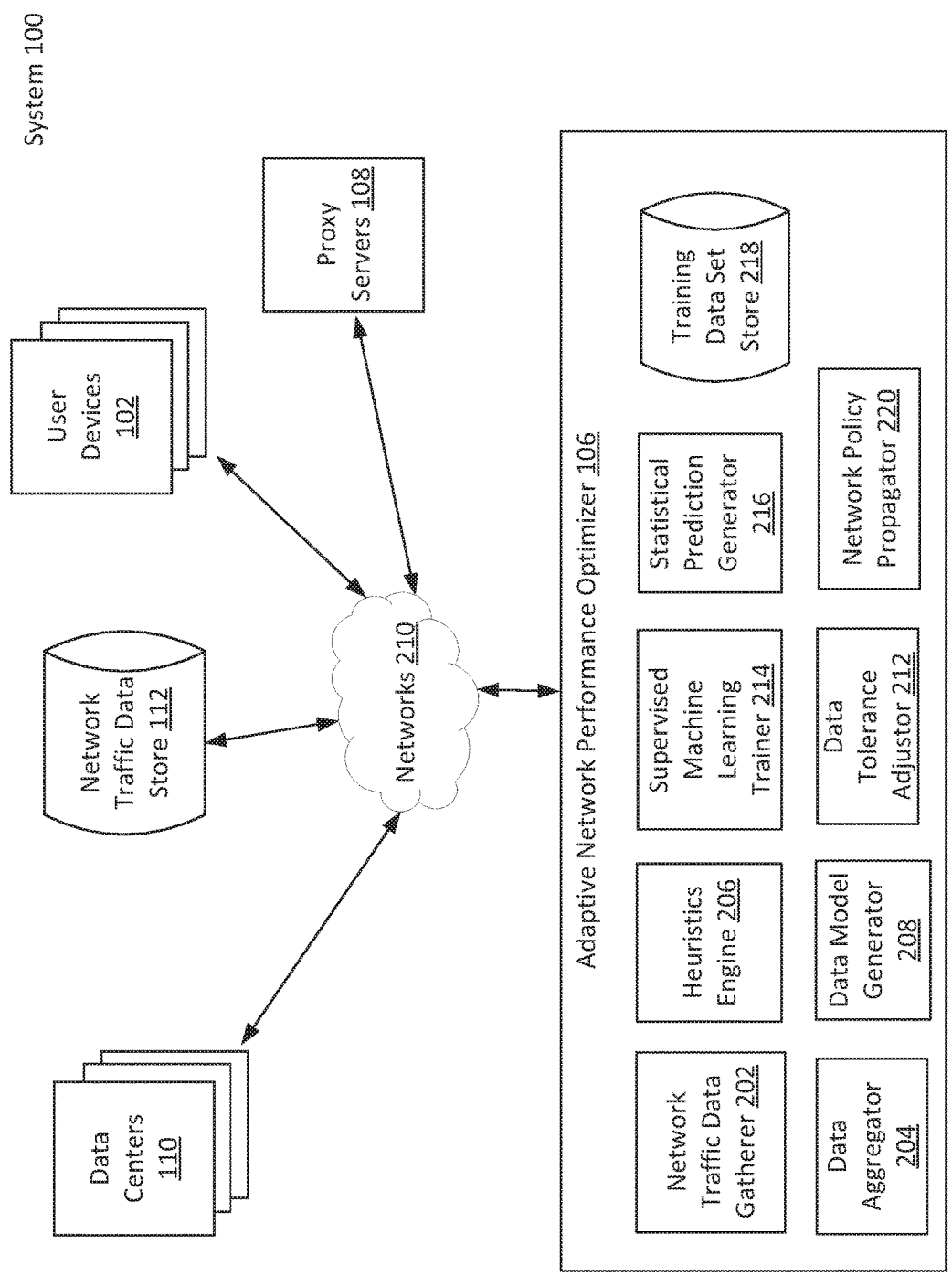
FIG. 2 illustrates a high-level block diagram, including an example adaptive network performance optimizer according to an embodiment of the invention.

FIG. 2 illustrates a high-level block diagram, including an example adaptive network performance optimizer, according to an embodiment. An adaptive network performance optimizer 106 may include a network traffic data gatherer 202, a data aggregator 204, a heuristics engine 206, a data model generator 208, a data tolerance adjustor 212, a supervised machine learning trainer 214, a statistical prediction generator 216, a training data set store 218, and a network policy propagator 220, in one embodiment. The adaptive network performance optimizer 106 may communicate data over one or more networks 210 with other elements of system 100, such as user devices 102, one or more proxy servers 108, data centers 110, and one or more network traffic data stores 112.

A network traffic data gatherer 202 may read, from a network traffic data store 112, one or more network data values associated with data requests between user devices 102 and data centers 110 through one or more proxy servers 108. In one embodiment, a network data value may be gathered by an agent 114 of a user device 102 or from a proxy server 108. The network traffic data gatherer 202 may retrieve network traffic data stored in one or more network traffic data stores 112 by the agent 114 or by the proxy server 108, in an embodiment.

A data aggregator 204 may aggregate data values over a fixed period of time (e.g., a month, a week, a day, etc.) for each combination of static policy and time block. A particular combination of static policy and time block may be referred to herein as a control field. Each aggregated row becomes a data point with information on the "goodness" of the TCP parameter used. Further, the distribution of control field values in this data set is representative of the mobile network traffic that is aimed for optimization. Every TCP parameter can be modeled as an inverse problem: a function of the download outcomes. For example, a moving average of the download complete time values for a particular combination of a static policy and a time block may be identified as the lowest (e.g., the fastest, etc.) download complete time across all time blocks. As a result, the particular combination of static policy and time block may be a good estimate of the best value for the TCP parameter. This good estimate of the best value for the TCP parameter may be used as a set of data points on which a machine may be trained in a "supervised" way, further described below as supervised learning method 400, in one embodiment.

A heuristics engine 206 may incorporate knowledge known to administrators of the adaptive network performance optimizer 106. A heuristic is a technique, method, or set of rules designed for solving a problem more quickly when classic methods are too slow, or for finding an approximate solution when classic methods fail to find any exact solution. Here, the heuristics engine 206 may incorporate knowledge known to the designers of the supervised learning method and techniques described herein to estimate TCP parameters, such as supervised learning method 400 below. For example, a particular carrier, such as AT&T, may have a maximum throughput of 50 MB/sec based on historical data. Thus, a transmission rate, a particular TCP parameter, may be throttled to a range of 20 to 30 MB/sec to ensure faster transmission and minimize the risk of packet loss.

A data model generator 208 may generate one or more data models to estimate TCP parameters as described above. Given the possibility of network changes over time and the deterministic nature of identifying optimal TCP parameter values using static policies and time blocks, the data model generator 208 may be used to identify an iterative process for a supervised learning algorithm, or method 400, to train a machine to achieve desired outputs. Here, the estimation of the best value of a single parameter given the control fields using the performance information in the data points follows a two-step Bayesian learning algorithm. First, the estimation of the best value is based on a generative module where the TCP parameter is an inverse function of the download outcomes such as throughput, time to first byte, and download complete time. A prediction algorithm is used to estimate the optimal value of this parameter. In order to estimate a value close to optimum that works well in practice, the data points are weighted by a function of their performance information and the traffic share associated with the particular aggregation. In this way, a set of data points may be generated to train the machine as a result of the supervised learning algorithm, or method 400.

After the best value of a single parameter is estimated based on a model generated by the data model generator 208, the posteriori probability of good performance is measured conditioned on the parameter estimate and other TCP and network parameters. For example, if the posteriori probability is high, the optimizer 106 may then choose this policy for use on future network traffic. This probability is estimated using information from other estimated or set TCP parameters hence taking into account possible dependencies using a statistical prediction generator 216, for example. For multiple TCP parameter estimation, this process is either parallelized if the parameters are independent in probability distribution or the estimation of the parameters is performed in cascade if independence cannot be determined. A supervised machine learning trainer 214 may iterate this two-step Bayesian learning algorithm using the generated datasets described above, stored in a training data set store 218.

A data tolerance adjustor 212 may ensure that an estimated TCP parameter falls within a particular tolerance based on the type of parameter. For discrete TCP parameter values, such as number of simultaneous network connections, the tolerance may be zero (0), for example. For continuous TCP parameter values, such as rate of transmission, the tolerance may be 10%, for example, in comparison with a black box optimization algorithm developed to retrieve TCP parameters which maximized performance based on calculation of network statistics. The objective function of the black box optimization is a function of performance improvement in throughput and download complete time, network congestion, and other network parameters. The optimization is constrained on thresholds for performance improvement metrics and traffic share. The black box algorithm outputs a set of TCP parameters which optimizes the objective function subject to the constraints. It operates on data aggregated over some period of time (e.g., a few days, etc.) and has no memory in the choice of statistics used to calculate this objective function and is purely deterministic.

In order to constrain the parameter space and generate relevant data sets to train the model on, the black box algorithm and the generation of static policies may be used in tandem by a supervised machine learning trainer 214 over multiple iterations. This gives the learning framework its adaptive nature. The static policies ensure that the adaptive learning framework explores the entire TCP parameter space and does not lead to focusing on local optima. The black box optimization algorithm guides the learning framework to focus on parts of the parameter space where performance improvements are likely to result. Because the learning algorithm has memory and is used in tandem with the above elements, the TCP parameter estimates have achieved a tradeoff between maximizing performance improvement over bypass traffic and generating stable estimates that do not fluctuate with short term network fluctuations, while enabling estimates to evolve over time.

A statistical prediction generator 216 may be used to generate calculations used in statistical prediction, including probability distributions, Bayesian probability, moving averages, regression analysis, predictive modeling, and other statistical computations. A training data set store 218 may be used to store training set data for generated data models, as described above. The training data set store 218 may include a subset of data stored on the network traffic data store 112, in one embodiment.

A network policy propagator 220 may deliver a network policy to user devices 102 and/or proxy servers 108. A network policy may be chosen based on the above described techniques and may be propagated by configuring a network interface on the user device 102 through an agent 114 or configuring network traffic management on a proxy server 108 through an accelerator 116, in an embodiment. In other embodiments, the network policy propagator 220 may send instructions to a user device 102 or a proxy server 108 on how to implement the chosen network policy based on the estimated TCP parameter.

4 Convergence on Optimum TCP Parameters

Figure 3:
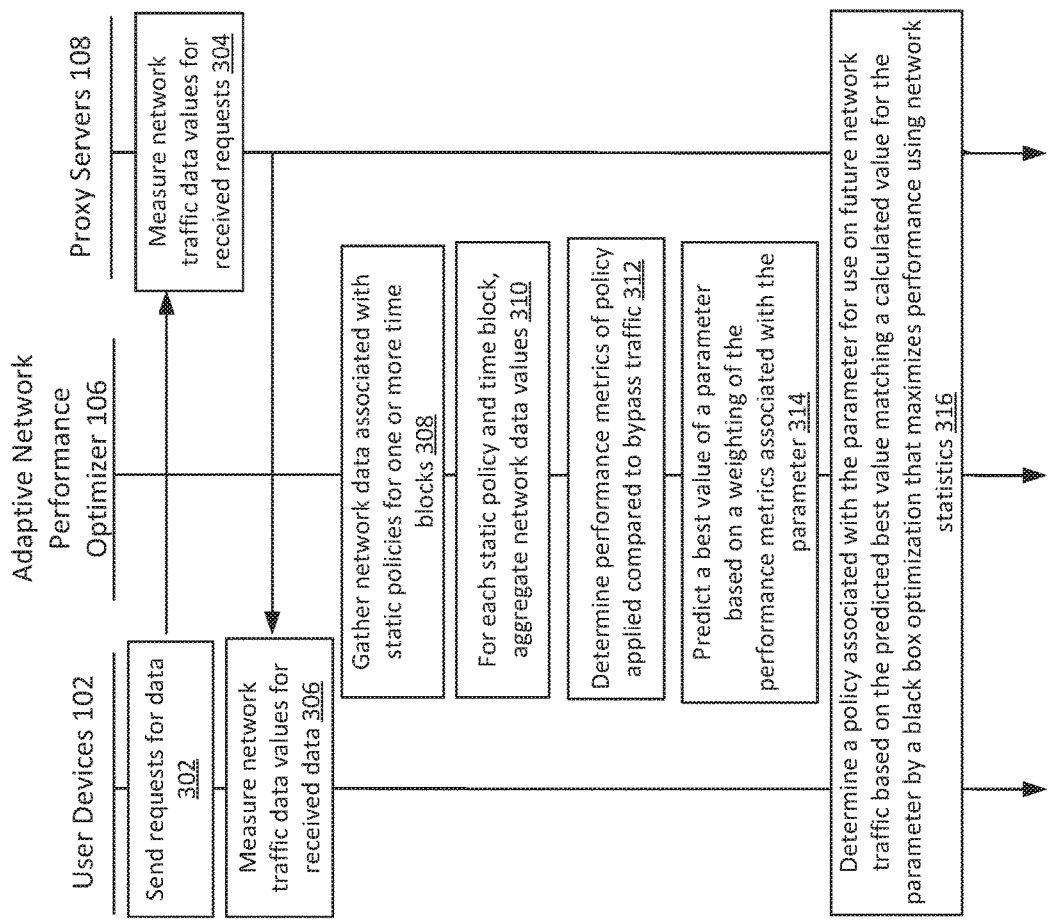
FIG. 3 illustrates a high-level interaction flow diagram of adaptive network policy optimization, according to an embodiment of the invention.

FIG. 3 illustrates a high-level interaction diagram of adaptive network policy optimization, according to an embodiment. User devices 102 may send 302 requests for data to proxy servers 108. In response, proxy servers 108 may measure 304 network traffic data values for received requests. As data is sent from proxy servers 108 to user devices 102, network traffic data values for received data may be measured 306 by user devices 102. Such raw network traffic data values may include download completion time, time to first byte, and throughput, for example.

Network data associated with static policies may be gathered 308 for one or more time blocks. As previously described, a possible parameter space, based on known information and/or heuristics, may include a range of parameter values. Static policies include randomly assigned parameter values retrieved from the range of parameter values in the possible parameter space. Mobile network traffic may then be assigned the static policies and data is gathered 308 by recording the network traffic data in the network traffic data store 112. A time block is a period of time during which the network traffic data is recorded in the network traffic data store 112.

For each static policy and time block, network data values may be aggregated 310. The network data values are aggregated 310 over a fixed period of time (e.g., the last month, the last week, the last day, etc.). The aggregation records outcomes of the download, such as the throughput, download complete time, and time to first byte, as a moving average over 24 hours. Performance metrics of policy applied compared to bypass traffic is determined 312 for each static policy and time block, and the performance metrics are stored within each row of aggregated data. Bypass traffic, as mentioned above, is a subset of traffic that is assigned default TCP parameters. In this way, the aggregated network data values provide qualitative information about how well the static policy performed over the bypass traffic. This aggregated data set is stored as training data in the training data set store 218.

A best value of a parameter may then be predicted 314 based on a weighting of the performance metrics associated with the parameter. A prediction algorithm is used to estimate the optimal value of this parameter. The estimation is based on a generative model where the TCP parameter is an inverse function of the download outcomes such as throughput, time to first byte and download complete time. As mentioned above, each aggregated row is a data point with information on the "goodness" of the TCP parameter used. To estimate a value close to optimum that works well in practice, the data points are weighted by a function of their performance information and the traffic share associated with the particular aggregation. Higher performing data points would be weighted more, as well as higher traffic share data points. For example, if it is determined that 25 MB per second transmission rate is high performing compared to bypass traffic, that value may be weighted more heavily than lesser performing data points. In this way, the best value of a parameter may be predicted 314.

A policy associated with the parameter may be determined 316 for use on future network traffic based on the predicted best value matching a calculated value for the parameter by a black box optimization that maximizes performance using network statistics. In this way, the approach taken by the learning algorithm is adaptive and multi-phase: phase 1 includes estimating the TCP parameters to predict a best value while phase 2 uses a greedy optimization that promotes the best outcomes given network statistics. Comparing phase 1 and phase 2 may also be defined as generating a model of convergence. A policy associated with the parameter may be determined 316 based on the predicted best value matching the calculated black box optimization value within a tolerance. In one embodiment, a policy may be determined 314 to fail because the phase 1 and phase 2 parameters do not converge. In a further embodiment, a policy may be determined 314 to fail because a prediction model on the convergence of the phase 1 and phase 2 parameters show less than a 55% likelihood of convergence. In this case, one or more hidden variables may be affecting the policy. For example, file size may be a dominant characteristic that affects a policy that enables throughput of 1 MB to 20 MB. Because file size may vary according to the user device task, such as small file downloads (e.g., web browsing, etc.) versus large file downloads (e.g., video streaming, etc.), file size may be a hidden variable that dominates the policy, causing it to fail. Other hidden variables may include server behavior, user device behavior, and network congestion.

Figure 4:
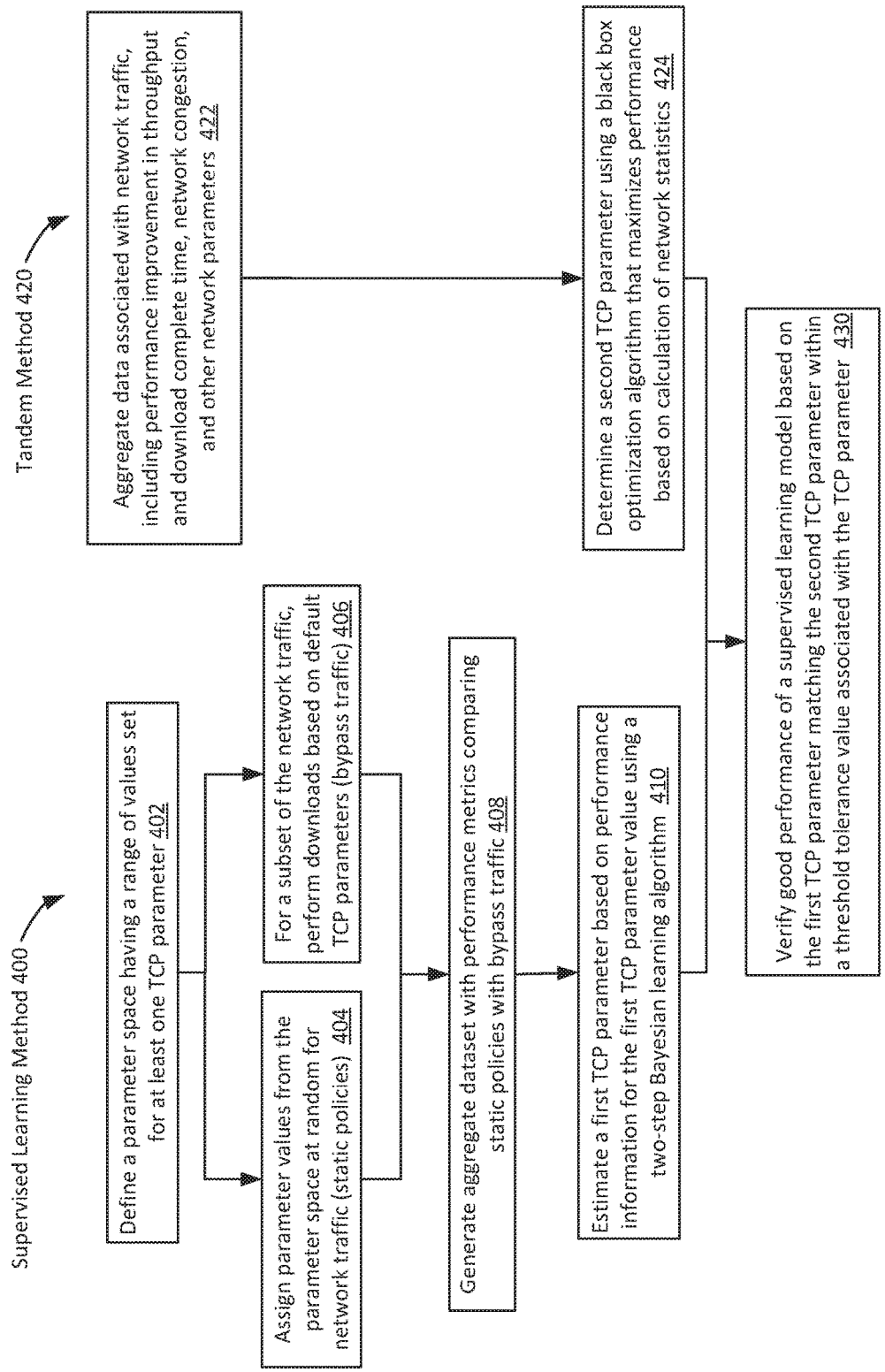
FIG. 4 illustrates a flowchart for adaptive network policy optimization, according to an embodiment of the invention.

FIG. 4 illustrates a flowchart for adaptive network policy optimization, according to an embodiment of the invention. Supervised Learning Method 400, using the supervised machine learning trainer 214 and data model generator 208, among other components in the adaptive network performance optimizer 106 as described above, may be used in adaptive network policy optimization, in an embodiment. A parameter space having a range of values set for at least one TCP parameter may be defined 402. This parameter space may be defined 402 based on known information and/or heuristics, for example. Parameter values from the parameter space may be assigned 404 at random for network traffic (static policies). For a subset of the network traffic, downloads may be performed 406 based on default TCP parameters (bypass traffic). As mentioned above, raw network traffic data may be gathered over time according to the randomly assigned TCP parameters or default TCP parameters.

An aggregate dataset may be generated 408 to have performance metrics comparing static policies with bypass traffic. Each data point in the aggregate dataset is an aggregation of the values recorded for a particular combination of TCP parameter and time block. Additionally, the distribution of control field values (each combination of TCP parameter and time block) in the aggregate data set is representative of the mobile network traffic being optimized due to the method of generation. Every TCP parameter may be modeled as an inverse problem: a function of the download outcomes.

A first TCP parameter may be estimated 410 based on performance information for the first TCP parameter value using a two-step Bayesian learning algorithm. In a tandem method 420, data associated with network traffic, including performance improvement in throughput and download complete time, network congestion, and other network parameters, may be aggregated 422. This data associated with network traffic may be used to determine 424 a second TCP parameter using a black box optimization algorithm that maximizes performance based on the calculation of network statistics.

Good performance of a supervised learning algorithm, method 400, or model may be verified 430 based on the first TCP parameter matching the second TCP parameter within a threshold tolerance value associated with the TCP parameter. TCP parameters may be associated with different threshold tolerance values. For example, a threshold tolerance value for a continuous TCP parameter, such as transmission rate, may be 10%, meaning that the first TCP parameter value should be within 10% of the second TCP parameter value. If the model is not verified 430, the supervised learning method 400 and tandem method 420 may repeat until the model converges.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a lot of information about the network available in the transit traffic itself—from billions of devices consuming data. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
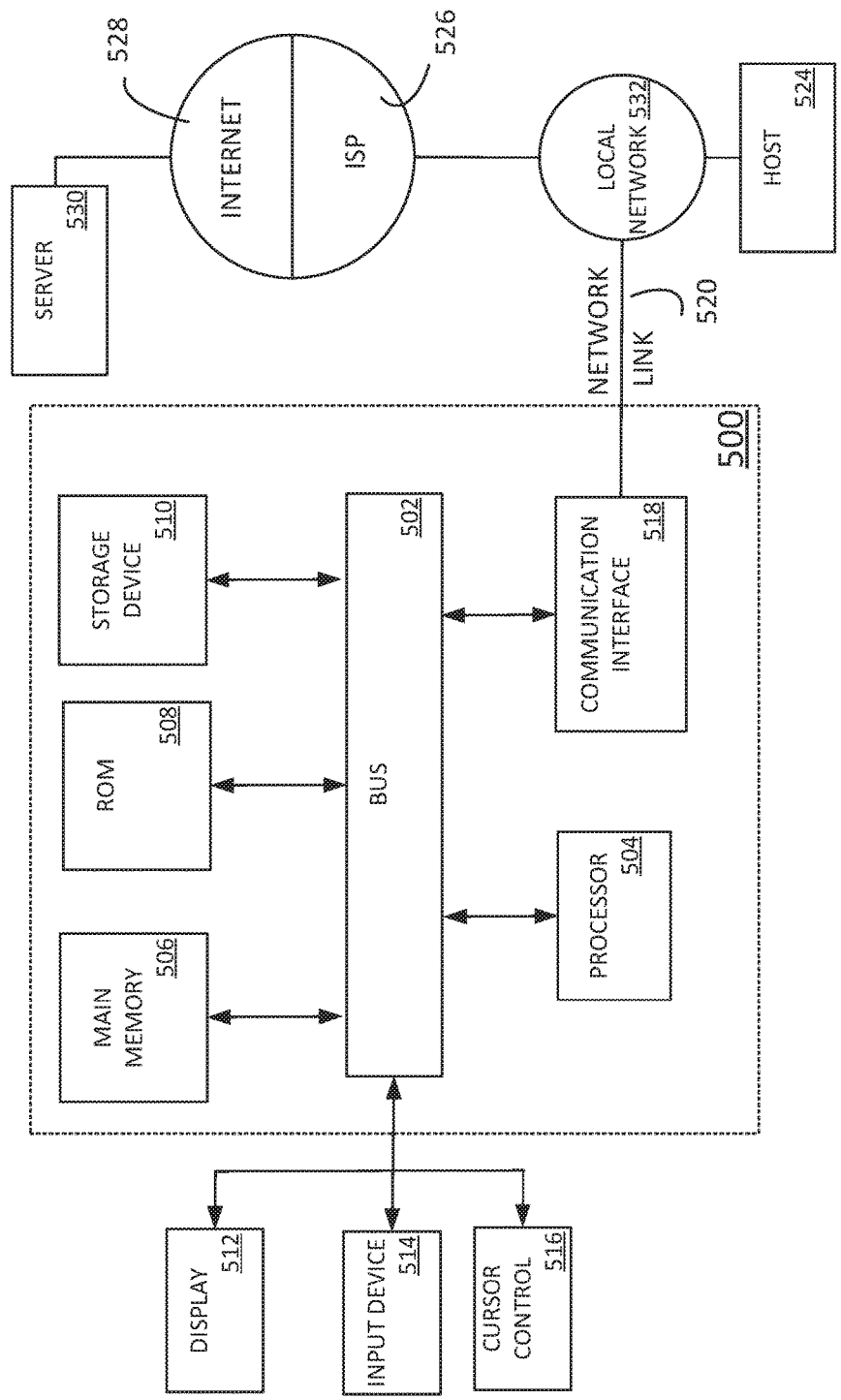
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
  receiving, at a plurality of proxy servers, a plurality of data transfer requests from a plurality of user devices;
  determining a range of parameter values associated with a TCP parameter;

assigning a random parameter value from the range of parameter values to the TCP parameter for a time block of a plurality of time blocks, the random parameter value comprising a static policy;
assigning a default TCP parameter value to a subset of the plurality of data transfer requests, wherein raw network traffic data values associated with the subset of the plurality of data transfer requests comprise bypass traffic data values;
determining a plurality of raw network traffic data values associated with the plurality of data transfer requests based on the static policy;
storing the bypass traffic data values and the plurality of raw network traffic data values based on the static policy in a network traffic data store;
for each combination of TCP parameter and time block of the plurality of time blocks:
    determining an aggregate data point having performance metrics comparing static policy against the bypass traffic data values;
    estimating a best value for the TCP parameter; and
    verifying the best value by comparing to a second TCP parameter value determined from a black box optimization, wherein the best value is verified based on a threshold tolerance value associated with the TCP parameter.

2. The method as recited in claim 1, further comprising determining a network policy associated with the TCP parameter for use on future network traffic based on the best value being within the threshold tolerance value.

3. The method as recited in claim 2, wherein each proxy server comprises an accelerator to implement the network policy.

4. The method as recited in claim 2, wherein each user device comprises an agent that implements the network policy.

5. The method as recited in claim 1, wherein determining the plurality of raw network traffic data values is performed by each proxy host based on the TCP parameter.

6. The method as recited in claim 1, wherein determining the plurality of raw network traffic data values is performed by each user device based on the TCP parameter.

7. One or more non-transitory computer-readable storage media, storing one or more sequences of instructions, which when executed by one or more processors cause performance of:
receiving, at a plurality of proxy servers, a plurality of data transfer requests from a plurality of user devices;
determining a range of parameter values associated with a TCP parameter;
assigning a random parameter value from the range of parameter values to the TCP parameter for a time block of a plurality of time blocks, the random parameter value comprising a static policy;
assigning a default TCP parameter value to a subset of the plurality of data transfer requests, wherein raw network traffic data values associated with the subset of the plurality of data transfer requests comprise bypass traffic data values;
determining a plurality of raw network traffic data values associated with the plurality of data transfer requests based on the static policy;
storing the bypass traffic data values and the plurality of raw network traffic data values based on the static policy in a network traffic data store;
for each combination of TCP parameter and time block of the plurality of time blocks:
    determining an aggregate data point having performance metrics comparing static policy against the bypass traffic data values;
    estimating a best value for the TCP parameter; and
    verifying the best value by comparing to a second TCP parameter value determined from a black box optimization, wherein the best value is verified based on a threshold tolerance value associated with the TCP parameter.

8. The one or more non-transitory computer readable storage media as recited in claim 7, wherein the one or more sequences of instructions, which when executed by the one or more processors cause further performance of: determining a network policy associated with the TCP parameter for use on future network traffic based on the best value being within the threshold tolerance value.

9. The one or more non-transitory computer readable storage media as recited in claim 8, wherein each proxy server comprises an accelerator to implement the network policy.

10. The one or more non-transitory computer readable storage media as recited in claim 8, wherein each user device comprises an agent that implements the network policy.

11. The one or more non-transitory computer readable storage media as recited in claim 7, wherein determining the plurality of raw network traffic data values is performed by each proxy host based on the TCP parameter.

12. The one or more non-transitory computer readable storage media as recited in claim 7, wherein determining the plurality of raw network traffic data values is performed by each user device based on the TCP parameter.

13. A system, comprising:
a subsystem, implemented at least partially in hardware, that receives, at a plurality of proxy servers, a plurality of data transfer requests from a plurality of user devices;
a subsystem, implemented at least partially in hardware, that determines a range of parameter values associated with a TCP parameter;
a subsystem, implemented at least partially in hardware, that assigns a random parameter value from the range of parameter values to the TCP parameter for a time block of a plurality of time blocks, the random parameter value comprising a static policy;
a subsystem, implemented at least partially in hardware, that assigns a default TCP parameter value to a subset of the plurality of data transfer requests, wherein raw network traffic data values associated with the subset of the plurality of data transfer requests comprise bypass traffic data values;
a subsystem, implemented at least partially in hardware, that a plurality of raw network traffic data values associated with the plurality of data transfer requests based on the static policy;
a subsystem, implemented at least partially in hardware, that stores the bypass traffic data values and the plurality of raw network traffic data values based on the static policy in a network traffic data store;
a subsystem, implemented at least partially in hardware, that for each of TCP parameter and time block of the plurality of time blocks:
    determines an aggregate data point having performance metrics comparing static policy against the bypass traffic data values;
    estimates a best value for the TCP parameter; and
    verifies the best value by comparing to a second TCP parameter value determined from a black box optimization, wherein the best value is verified based on a threshold tolerance value associated with the TCP parameter.

14. The system as recited in claim 13, further comprising a subsystem, implemented at least partially in hardware, that determines a network policy associated with the TCP parameter for use on future network traffic based on the best value being within the threshold tolerance value.

15. The system as recited in claim 14, wherein each proxy server comprises an accelerator to implement the network policy.

16. The system as recited in claim 14, wherein each user device comprises an agent that implements the network policy.

17. The system as recited in claim 13, wherein determining the plurality of raw network traffic data values is performed by each proxy host based on the TCP parameter.

18. The system as recited in claim 13, wherein determining the plurality of raw network traffic data values is performed by each user device based on the TCP parameter.

* * * * *